E. J. RENFROW.
LOCK FOR SPARE RIM AND TIRE CARRIERS.
APPLICATION FILED NOV. 25, 1919.
1,379,937.   Patented May 31, 1921.
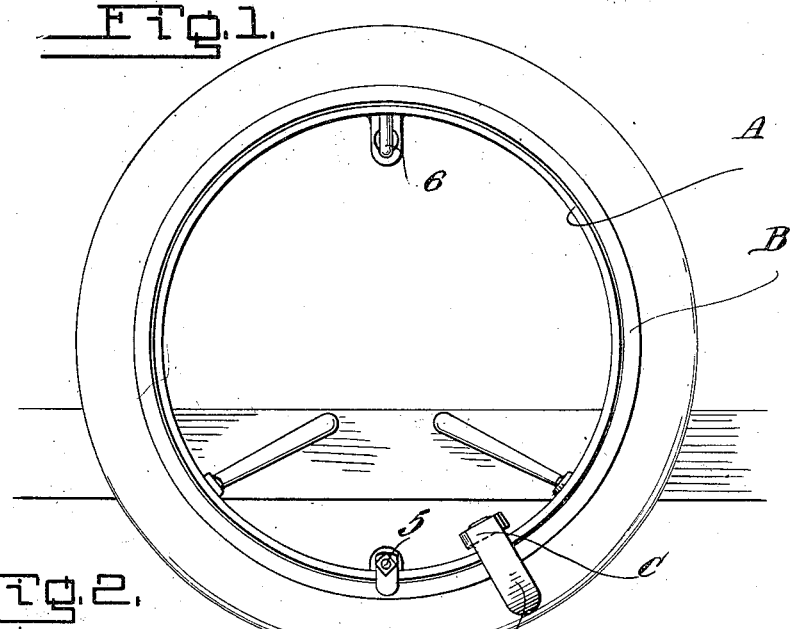
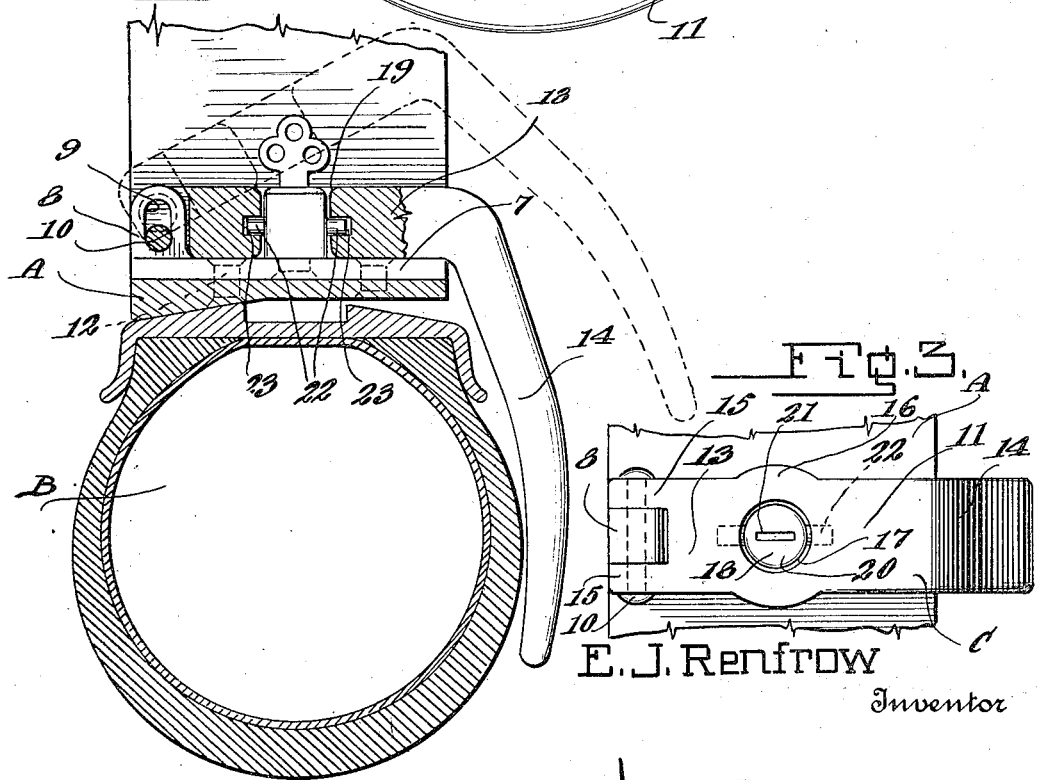
E. J. Renfrow
Inventor

UNITED STATES PATENT OFFICE.

EARL J. RENFROW, OF MODESTO, CALIFORNIA.

LOCK FOR SPARE RIM AND TIRE CARRIERS.

1,379,937.
Specification of Letters Patent.
Patented May 31, 1921.

Application filed November 25, 1919. Serial No. 340,504.

*To all whom it may concern:*

Be it known that I, EARL J. RENFROW, a citizen of the United States, residing at Modesto, in the county of Stanislaus and State of California, have invented certain new and useful Improvements in Locks for Spare Rim and Tire Carriers, of which the following is a specification.

This invention relates to tire and rim carriers, and the primary object of the invention is to provide an improved lock for effectively holding the spare rim and tire in position upon the carrier, so as to prevent the removal thereof by unauthorized persons.

Another object of the invention is the provision of an improved lock for spare rim and tire carriers embodying a locking lever or hasp for engaging the tire tread and having an approved means for engaging the lever or hasp for holding the same against movement when in an operative position.

A further object of the invention is to provide an improved lock for rim and tire carriers which will be noiseless and convenient to operate, and which will present a pleasing appearance to the eye.

A still further object of the invention is to provide an improved lock of the above character, which is durable and efficient in use, one which is simple and easy to manufacture, and one which can be placed on the market at a reasonable cost.

With these and other objects in view, the invention consists of the novel construction, arrangement and formation of parts as will be hereinafter more fully described, claimed and illustrated in the accompanying drawings, forming a part of this specification, in which—

Figure 1 is an elevation of a spare rim and tire carrier showing a tire and rim positioned thereon and provided with the improved lock.

Fig. 2 is a transverse section through the carrier, rim and tire showing the lock therefor in operative position, parts of the same being shown in section.

Fig. 3 is a plan view of the improved lock.

Referring to the drawings, in detail, wherein similar reference characters designate corresponding parts throughout the several views, the letter A indicates a rim and tire carrier having the usual rim and tire B placed thereon, and provided with the improved lock C.

The carrier A is of the ordinary or any preferred configuration and is provided with the usual retaining lugs 5 for the rim. The carrier A is also provided with the usual aperture for receiving the inflating valve 6 of the tire B.

The improved lock C is positioned preferably directly diametrically opposite, or substantially diametrically opposite the aperture in the rim A for the inflating valve 6, so as to coöperate with the same for preventing removal of the tire and rim. The lock C includes a base plate 7, having a length substantially the same as the width of the rim A and provided at one end thereof with an upstanding ear 8 which is provided with a longitudinally extending slot 9 which slidably and pivotally receives the pivot pin 10, carried by the rear end of the locking lever or hasp 11, which will be hereinafter more fully described. The base plate 7 is riveted or otherwise secured as at 12 to the inner surface of the carrier, and the heads of the rivets are preferably countersunk, as shown. In applying the device, to rims being manufactured the base plate 7 may be dispensed with if so desired, and the ear 8 formed integral with the inner surface of the rim A or welded or riveted thereto.

The locking lever or hasp 11 includes the body 13, which is adapted to engage the outer surface of the base plate, and the right angularly disposed arcuate operating handle and tire engaging member 14. The rear end of the body 13 of the lever or hasp 11 is provided with spaced ears 15 which are adapted to engage the opposite sides of the upstanding ear 8, and the same carries the pivot pin 10, which provides means for pivotally and slidably holding the hasp or lever 11 in position.

The body 13 of the lever at the central portion thereof may be slightly increased in width as at 16, and this portion of the body is provided with a vertical aperture 17 for the reception of a lock 18 of the ordinary or any preferred construction rigidly secured to the outer surface of the base plate or carrier frame, as the case may be. The upper and lower edges of the opening 17 are rounded or beveled as at 19 so as to facilitate the swinging of the lever on or off of the lock 18. As stated, the lock 18 may be of the ordinary or any preferred construction similar to the ordinary Yale or Corbin lock, and includes the cylindrical body 20 having a key receiving opening 21 therein, and the outwardly extending spring pressed cylindrical bolts 22. The wall of the opening 17 is provided with an annular groove 23 at its central portion, which is adapted to receive the locking bolts 22.

In operation of the improved device, the tire and rim B is applied to the frame of the rim carrier A in the ordinary manner, and the lock lever or hasp 11 is swung on its pivot and moved downwardly over the lock 18 so as to position the handle 14 in engagement with the outer surface of the tire. The bolts 22 riding into the annular groove 23 absolutely prevent actuation of the lever 11, which firmly holds the tire and rim in position against removal by unauthorized persons. The lever or hasp 11 is, as stated, positioned substantially diametrically opposite the tire valve 6, and the tire valve prevents the portion of the rim opposite to the lock B from being moved off of the rim.

From the foregoing description it can be seen that an improved lock is provided for spare rim and tire carriers, which will effectively hold the rim and tire against theft by unprincipled persons, which will be easy to operate and efficient in use.

Changes in details may be made without departing from the spirit or scope of my invention, but;

I claim:

1. The combination with a spare tire and rim carrier comprising an annular body having an opening therein, a tire and rim arranged on the annular body, the tire having an inflating valve positioned in the opening, of a lock carried by the inner surface of the annular body for preventing the unauthorized removal of the rim and tire from the carrier including a lever extending transversely of the annular body and arranged substantially opposite to the opening formed therein, means slidably and pivotally connecting the inner end of the lever to the body, said lever having a radially extending relatively broad locking arm formed thereon for engaging the side wall of the tire, when the lever is moved to its operative position, and a key operated lock associated therewith and adapted to engage the lever to prevent unauthorized actuation thereof when the lever is in its operative position.

2. The combination with a spare rim and tire carrier, of a lock therefor including a transversely extending locking arm slidably and pivotally associated with the carrier, and a key-operated lock associated with the carrier arranged to engage the lever to hold the same against operation and in engagement with the rim and tire.

3. A lock for spare rim and tire carriers comprising a base plate, an upstanding slotted ear carried by one terminal of the base plate, and a locking arm associated with the base plate including a pair of ears arranged to engage the ear, a pivot pin extending through the slot of the upstanding ear and carried by the ears of the locking arm, the central portion of the locking arm having a cylindrical aperture therein, the wall of the aperture being provided with a groove, and a key operated lock carried by the base plate and including a body arranged to be positioned in the opening when the lever is swung into operative position, and a bolt carried by the key operated lock arranged to engage in the groove.

4. The combination with a spare tire and rim carrier, of a lock therefor including an upstanding slotted ear, a transversely extending locking lever, a pivot pin carried by the locking lever and slidably and rotatably positioned in the slot in said ear, the lever including a body arranged to overlie the carrier, and a right angularly extending relatively broad operating handle arranged to engage the tire and rim when the lever is moved into operative position, and means arranged on the carrier for releasably engaging the lever to hold the same against accidental displacement.

EARL J. RENFROW.